United States Patent Office 3,590,023
Patented June 29, 1971

3,590,023
OLEFIN COPOLYMERS AND PROCESS FOR THE PREPARATION THEREOF
Alberto Valvassori and Nazzareno Cameli, Milan, Italy, assignors to The B. F. Goodrich Company, Akron, Ohio
No Drawing. Filed Nov. 29, 1967, Ser. No. 686,760
Claims priority, application Italy, Nov. 30, 1966, 30,558/66
Int. Cl. C08f 15/40
U.S. Cl. 260—79.5
17 Claims

ABSTRACT OF THE DISCLOSURE

This invention provides new, amorphous, vulcanizable copolymers of ethylene, higher alpha-olefins, and one or more alkylbicyclononadienes which are 3,4-alkyl-bicyclo-(4,2,1)-nona-3,7-dienes of the formula

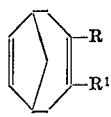

in which R and $R^1$ represent hydrogen or an alkyl group; and processes for obtaining the copolymers by polymerizing a mixture of the monomers in contact with catalysts which act with a mechanism of the coordinated anionic type.

---

Prior applications originating with our group have disclosed linear, amorphous, unsaturated and vulcanizable copolymers of one or more monoolefins selected from ethylene and higher alpha-olefins with conjugated or non-conjugated linear or cyclic polyenes.

An object of the present invention was to provide a new class of copolymers capable of being vulcanized to elastomers having good mechanical properties.

We have accomplished this and other objects by copolymerizing, in contact with particular coordination catalysts of the anionic type, mixtures of one or more of the alkylbicyclononadienes with ethylene and higher alpha-olefins to copolymerizates consisting of macromolecules each of which is made up of polymerized units of all of the starting monomers.

In the 3,4-alkyl-bicyclo(4,2,1)-nona-3,7-dienes used as comonomers for the production of the present copolymerizates and having the general formula given above, in which R and $R^1$ are hydrogen or an alkyl group, at least one of R and $R^1$ is an alkyl group containing from 1 to 6 carbon atoms. Examples of suitable monomers corresponding to said formula include 3-methyl-bicyclo(4,2,1)nona-3,7-diene
3,4-dimethyl-bicyclo(4,2,1)nona-3,7-diene
3-ethyl-bicyclononadiene
4-propyl-bicyclononadiene Such monomers can be prepared readily by submitting a mixture of cyclopentadiene and homologues of 1,3-butadiene having the general formula

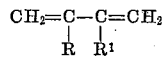

wherein R and $R^1$ have the same significance as above, to irradiation with ultraviolet light, in the presence of carbonyl compounds, aromatic hydrocarbons containing condensed rings, or derivatives thereof.

The higher alpha-olefins which are copolymerized with ethylene and the alkylbicyclononadienes to obtain the copolymers of the invention have the general formula $R-CH=CH_2$ in which R is an alkyl group containing 1 to 6 carbon atoms. The presently preferred higher alpha-olefins are propylene and butene-1.

By copolymerizing the mixed monomers under the conditions described hereinbelow, there is obtained a crude (total) copolymerization product which consists of macromolecules in each of which units of all of the starting monomers are randomly distributed. These copolymerizates can be defined as substantially linear, that is, as being substantially free of long branches. The substantially linear structure is demonstrated by the fact the properties of the new copolymerizates, more particularly the viscous behavior, are practically identical with those of known linear copolymers of ethylene and a higher alpha-olefin.

The present copolymerizates have molecular weights above 20,000, determined viscosimetrically. The intrinsic viscosity, determined in tetrahydronaphthalene at 135° C., or in toluene at 30° C., is higher than 0.5.

The composition of the copolymers is homogeneous, as demonstrated by the ease with which the copolymers can be vulcanized effectively, using conventional mixes based on sulfur and accelerators. This also establishes that the unsaturations are well-distributed along the copolymer chain.

The vulcanized copolymers have very good mechanical strength and low permanent sets at break. The good mechanical characteristics of the elastomers resulting from the vulcanization adapt the same to use in the applications for which natural and synthetic rubbers are employed, such as, for example, in the preparation of tires, pipes, air tubes, elastic yarns, gaskets, etc.

The copolymers and vulcanizates can be extended with hydrocarbon oils. Paraffinic and naphthenic oils are generally preferred as extenders. However, aromatic oils can also be used.

The catalytic systems used to promote copolymerizations of the mixed monomers are prepared from organometallic compounds or hydrides of aluminum and vanadium compounds. The components are selected so that the catalysts are highly dispersible, colloidally dispersible, or completely soluble in the hydrocarbons useful as the liquid copolymerization medium or diluent, such as aliphatic, cycloaliphatic and aromatic hydrocarbons.

The useful organometallic compounds or hydrides of aluminum include aluminum trialkyls, aluminum dialkylmonohalides, aluminum monoalkyl dihalides, aluminum alkylsesquihalides, aluminum alkenyls, aluminum alkylenes, aluminum cycloalkyls, aluminum cycloalkyl alkyls, aluminum aryls, aluminum alkyl aryls, aluminum hydrides, aluminum alkyl hydrides, aluminum halogen hydrides, complexes of the aforementioned organometallic compounds with preferably weak Lewis bases.

It is also possible to use organometallic compounds in which the metal is bound through main valences not only to carbon and/or halogen atoms but also to oxygen atoms bound to an organic group, such as, e.g., aluminum dialkyl alkoxides and aluminum alkyl alkoxy halides.

Non-restrictive specific examples of these compounds are: aluminum triethyl, aluminum triisobutyl, aluminum trihexyl, aluminum diethyl monochloride, aluminum diethyl monoiodide, aluminum diethyl monofluoride, aluminum diisobutyl monochloride, aluminum monoethyl dichloride, aluminum ethyl sesquichloride, aluminum butenyl diethyl, aluminum iso-hexenyl diethyl, aluminum tri(dimethyl cyclopentyl methyl) aluminum triphenyl, diphenyl aluminum monochloride, aluminum diisobutyl monochloride complexed with anisol, aluminum monochloro monoethyl monoethoxide, aluminum diethyl propoxide, aluminum diethyl amyloxide, and aluminum monochloro monopropyl monopropoxide.

Vanadium compounds soluble in the hydrocarbons employable as the copolymerization medium are preferably used in the preparation of the catalyst.

Halides and oxyhalides such as e.g. $VCl_4$, $VOCl_3$, $VBr_4$, and compounds in which at least one of the valences of the metal is saturated by a hetero atom (more particularly oxygen or nitrogen) bound to an organic group, such as e.g., vanadium triacetylacetonate and tribenzoylacetonate, vanadyl diacetylacetonate, halogen acetylacetonates, trialcoholates and halogen alcoholates, tetrahydrofuranates, etherates, aminates, pyridinates and quinolinates of vanadium tri- and tetrachloride and of vanadyl trichloride are therefore used.

Vanadium compounds insoluble in hydrocarbons, selected from organic salts such as e.g., vanadium triacetate, tribenzoate, tristearate, and inorganic compounds such as $VO_2Cl$, can also be used.

In practice, there are used catalytic systems of the aforementioned type containing halogen atoms, that is systems in which at least one of the catalyst-forming components contains at least one halogen atom.

The copolymerization process of the present invention can be carried out at temperatures comprised between $-80°$ and $+125°$ C.

If the catalyst is prepared from a vanadium compound and an alkyl aluminum halide, in order to obtain high yields of copolymer per weight unit of catalyst used, both the preparation of the catalyst and the copolymerization are conveniently carried out at temperatures comprised between $0°$ C. and $-80°$ C., preferably between $-10°$ and $-50°$ C.

By operating under these conditions the catalysts have an activity much higher than that of the same catalytic systems prepared and used at higher temperatures. Moreover, by operating at the aforementioned low temperatures, the activity of the catalysts remains practically unaltered with time.

If the catalyst is prepared from an alkyl aluminum monohalide and from vanadium triacetylacetonate, vanadyl trialkoxides or vanadyl halogen alkoxides at temperature comprise between $0°$ C. and $125°$ C., in order to obtain high productions of copolymer it is convenient to operate in the presence of particular complexing agents selected from ethers, thioethers, tri-substituted tertiary amines or phosphines containing at least one branched alkyl group or an aromatic nucleus.

The amount of complexing agent is preferably comprised between 0.05 and 1 mole per mole of aluminum alkyl halide.

The activity of the catalysts varies with the molar ratio between the compounds used in the preparation thereof.

According to the present invention it has been found that, when the catalyst-forming components comprise an aluminum trialkyl and vanadium halides or oxyhalides, the preferred molar ratio between aluminum trialkyl and vanadium compound is comprised between 1 and 5, preferably between 2 and 4. On the contrary, when the catalyst-forming components comprise a dialkyl aluminum monochloride (e.g., $AlEt_2Cl$) and vanadium triacetylacetonate ($VAc_3$) the best results are obtained with an $AlEt_2Cl/VAc_3$ molar ratio comprised between 2 and 20, preferably between 4 and 10.

The copolymerizatioin can be carried out in an aliphatic, cycloaliphatic or aromatic hydrocarbon solvent consisting e.g., of butane, pentane, n-heptane, cyclohexene, toluene, xylene or their mixture.

Halogenated hydrocarbons, such as e.g., chloroform, trichloroethylene, chlorobenzenes, tetrachloroethylene, methylene chloride, dichloroethane, etc., can also be used as the liquid copolymerization medium.

Particularly high copolymerization rates can be obtained by effecting the copolymerization in the substantial absence of an inert solvent, and maintaining the monomers in the liquid state, namely, e.g., in a solution of ethylene in the mixtures of aliphatic olefins and of alkyl bicyclononadienes to be copolymerized.

The concentration of the monomers in the reacting liquid phase should preferably be kept constant or at least as constant as possible during the copolymerization. To this purpose it can be convenient to carry out the copolymerization continuously by continuously feeding and discharging a mixture of monomers with constant composition and by operating with high spatial rates.

By varying the composition of the monomer mixture the composition of the copolymers can be varied within wide limits.

If amorphous copolymers of alkylbicyclononadienes with ethylene and propylene are to be obtained, an ethylene/propylene molar ratio lower than or at most equal to 1:4 should be maintained in the liquid reacting phase, corresponding to an ethylene/propylene molar ratio in the gaseous phase lower than or, at most, equal to 1:1 under normal conditions. Molar ratios between 1:200 and 1:4 in the liquid phase are usually preferred.

If butene-1 is used instead of propylene, the ethylene/butene molar ratio in the liquid phase must be lower than or at most equal to 1:20, corresponding to a molar ratio between ethylene and butene-1 in the gaseous phase lower than or at most equal to 1:1.5 under normal conditions. Molar ratios in the liquid phase comprised between 1:1,000 and 1:20 are normally preferred.

By operating under these conditions, amorphous copolymers containing less than about 75% by mols of ethylene are obtained. If these values are exceeded, the copolymer shows a crystallinity of polyethylenic type.

The lower limit of the ethylene content is not critical; however, it is preferable that the copolymers contain at least 5% by mols of ethylene. The alpha-olefin content can vary from a minimum of 5% by mols to a maximum of 95% by mols and preferably between 40 and 60%. The alkylbicyclononadiene content in the copolymer is generally comprised between 0.1% and 20% by mols, preferably between 1% and 5% by mols. The upper limit of the alkylbicyclononadiene content can be raised but, more particularly for economical reasons, it is not convenient to introduce into the copolymer a content of those monomers higher than 20% by mols.

The following examples serve to better illustrate the invention without however limiting its scope.

EXAMPLE 1

The reaction apparatus consists of a glass cylinder having a diameter of 5.5 cm. and a capacity of 1200 cc. provided with stirrer and an inlet tube for the gases. The gas inlet tube reaches the bottom of the cylinder and terminates in a porous diaphragm (diameter of 3.5 cm.).

700 cc. of anhydrous n-heptane and 1 cc. of 3,4-dimethyl-bicyclo(4,2,1)nona-3,7-diene are introduced into the reactor kept under nitrogen. Through the gas inlet tube a gaseous propylene ethylene mixture in the molar ratio of 3:1 is introduced and circulated at the flow-rate of 400 N l./h.

In a 100 cc. flask, kept at $-20°$ C. under nitrogen, the catalyst is preformed by reacting 0.5 millimol of vanadium tetrachloride and 1.25 millimols of $Al_2Et_3Cl_3$ in 50 cc. of anhydrous n-heptane. The catalyst thus preformed is siphoned under nitrogen pressure into the reactor.

The gaseous ethylene-propylene mixture is continuously fed and discharged at the flow-rate of 400 N l./h. After 5 minutes and 40 seconds from the start of the reaction, the reaction is stopped by adding 20 cc. of methanol containing 0.1 g. of phenyl-beta-naphthylamine.

The product obtained is purified in a separating funnel under nitrogen by repeated treatments with diluted hydrochloric acid and then with water and finally coagulated with acetone.

After vacuum drying, 10 g. of a solid product, amorphous by X-ray examination, having the appearance of a non vulcanized elastomer, and completely soluble in boiling n-heptane, are obtained. The ethylene/propylene molar ratio in the copolymer is 1:1.

100 parts by weight of this ethylene-propylene dimethylbicyclononadiene terpolymer are mixed in a laboratory roll mixer with 50 parts of carbon black HAF, 5 parts of zinc oxide, 1.5 parts of sulfur, 1.5 parts of tetramethylthiuram monosulfide and 0.5 part of mercaptobenzothiazole. The mixture is vulcanized in a press at 150° C. for 60 minutes. A vulcanized lamina having the following characteristics is obtained:

tensile strength: 186 kg./cm.$^2$
elongation at break: 480%
modulus at 300%: 96 kg./cm.$^2$
permanent set at break: 12%

EXAMPLE 2

The reaction apparatus consists of a 1-litre glass autoclave provided with stirrer and gas inlet tube. 500 cc. of propylene, 8 cc. of 3,4-dimethylbicyclo(4,2,1)-nona-3,7-diene and 0.3 millimol of diethyl zinc are introduced into the autoclave kept at −20° C. Ethylene is then introduced until a pressure increase of 1 atm. is obtained.

From two separated metering devices, the catalyst components are introduced into the reactor, first 1.125 millimols of AlEt$_2$Cl dissolved in 3 cc. of anhydrous n-heptane and then 0.15 millimol of vanadyl chloride dissolved in 3 cc. of anhydrous n-heptane. During the polymerization, the pressure is kept constant by feeding into the copolymerization zone an amount of ethylene corresponding to that adsorbed.

After 60 minutes the reaction is stopped. The olefins are removed and the product dissolved in cyclohexane is purified in a separating funnel by repeated treatments with diluted hydrochloric acid and then with water and is coagulated in acetone. After vacuum drying there are obtained 15.5 g. of solid product which is amorphous on X-ray examination, looks like a non-vulcanized elastomer, and is completely soluble in boiling n-heptane.

The examination by infared spectrography shows a propylene content corresponding to 30% by weight.

100 parts by weight of this terpolymer are mixed, on a laboratory roll mixer, with 1 part of stearic acid, 5 parts of zinc oxide, 80 parts of carbon black ISAF, 55 parts of naphthenic oil, 0.75 part of mercaptobenzothiazole, 1.5 parts of tetramethylthiuram monosulfide and 1.5 parts of sulfur. The mixture thus obtained is vulcanized in a press at 150° C. for 60 minutes.

A vulcanized lamina having the following characteristics is obtained:

tensile strength: 243 kg./cm.$^2$
elongation at break: 520%
modulus at 200%: 58 kg./cm.$^2$
modulus at 300%: 118 kg./cm.$^2$
permanent set at break: 18%

EXAMPLE 3

700 cc. of anhydrous n-heptane and 1 cc. of 3-methylbicyclo(4,2,1)-nona-3,7-diene are introduced into a reaction apparatus like that described in Example 1, kept at −20° C. Through the gas inlet tube, a gaseous ethylene-propylene mixture in the molar ratio of 3:1 is introduced and circulated at the rate of 400 N l./h.

The catalyst is pre-formed in a 100 cc. flask kept at −20° C. under nitrogen, by reacting 0.25 mm. of vanadium tetrachloride and 1.25 mm. of Al$_2$Et$_3$Cl$_3$ in 50 cc. of anhydrous n-heptane, and is then siphoned into the polymerization reactor by means of a nitrogen pressure.

The propylene-ethylene mixture is continuously fed and discharged at the rate of 400 N l./h.

After 10 minutes from the introduction of the catalyst, the reaction is stopped by the addition of 10 cc. of methanol containing 0.1 g. of phenyl-beta-naphthylamine. The product is purified and isolated as described in Example 1.

After vacuum drying there are obtained 4.5 g. of a solid product which is amorphous on X-ray examination, looks like a non-vulcanized elastomer, and is completely soluble in boiling n-heptane.

The ethylene-propylene molar ratio in the terpolymer is about 1:1.

The terpolymer is vulcanized with the same mix and the same modalities of Example 1. A vulcanized lamina having the following characteristics is obtained.

tensile strength: 200 kg./cm.$^2$
elongation at break: 480%
modulus at 200%: 50 kg./cm.$^2$
modulus at 300%: 100 kg./cm.$^2$
permanent set: 14%

Similar results are obtained using other alkylbicyclononadienes as disclosed herein as termonomer.

By "high molecular weight" as used herein is meant that the copolymers of the invention are normally solid.

Since changes and variations in details may be made in practicing the invention, without departing from the spirit thereof, we intend to include in the scope of the appended claims all such modifications as will be obvious to those skilled in the art from the description and working examples given herein.

What is claimed is:

1. Substantially linear amorphous and vulcanizable, unsaturated, high molecular weight copolymers of at least one alkylbicyclononadiene having the general formula

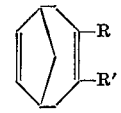

in which R and R' are selected from the group consisting of hydrogen and the methyl group and at least one of them is the methyl group, with ethylene and at least one higher alpha-olefin of the formula CH$_2$=CHR in which R is an alkyl group containing from 1 to 6 carbon atoms, said copolymers consisting essentially of macromolecules made up of polymerized units of each of the starting monomers, in which the ethylene content is at least 5% by mols, the higher alpha-olefin content is from 5% to 95% by mols, and the bicyclononadiene content is from about 0.1% to about 20% by mols.

2. Copolymers according to claim 1, further characterized in consisting essentially of macromolecules made up of polymerized units of ethylene of at least one of the higher alpha-olefins, and of at least one 3,4-alkyl-bicyclo (4,2,1-)-nona-3,7-diene.

3. Copolymers according to claim 1, further characterized in consisting essentially of macromolecules made up of polymerized units of ethylene, propylene, and 3-methylbicyclo(4,2,1)nona-3,7-diene.

4. Copolymers according to claim 1, further characterized by consisting essentially of macromolecules made up of polymerized units of ethylene of propylene and of 3,4-dimethyl-bicyclo(4,2,1)nona-3,7-diene.

5. The copolymers of claim 1, sulfur-vulcanized to elastomers.

6. A process for preparing substantially linear, amorphous and vulcanizable unsaturated high molecular weight copolymers of at least one alkylbicyclononadiene having the formula

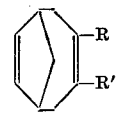

in which R and R' are selected from the group consisting of hydrogen and the methyl group, and at least one of them is the methyl group, with ethylene and at least one higher alpha-olefin of the formula CH$_2$=CHR in which R is an alkyl group containing from 1 to 6 carbon atoms, which copolymers consist essentially of macromolecules made up of polymerized units of each of the starting monomers, in which the ethylene content is at least 5% by mols, the higher alpha-olefin content is from 5% to 95% by mols, and the bicyclononadiene content is from about 0.1% to about 20% by mols, said process being characterized in that a mixture of the monomers is copolymerized in contact with a catalyst the active components of which comprise (a) a vanadium compound; and
  (b) a substance selected from the group consisting of organometallic compounds and hydrides of aluminum.

7. The process according to claim 6, further characterized in that at least one of the catalyst components (a) and (b) contains at least one halogen atom.

8. The process according to claim 6, further characterized in that catalyst component (a) is a hydrocarbon-soluble vanadium compound.

9. The process according to claim 8, further characterized in that the hydrocarbon-soluble vanadium compound is selected from the group consisting of vanadium halides and oxyhalides, and vanadium compounds in which at least one of the vanadium valences is saturated by a heteratom selected from the group consisting of nitrogen and oxygen.

10. The process according to claim 6, further characterized in that catalyst component (a) is a hydrocarbon-insoluble vanadium compound selected from the group consisting of $VO_2Cl$, vanadium triacetate, vanadium tribenzoate and vanadium tristearate.

11. The process according to claim 6, further characterized in that the monomers are copolymerized at a temperature in the range $-80°$ C. to $125°$ C.

12. The process according to claim 6, further characterized in that the monomers are copolymerized at a temperature in the range $-80°$ C. to $0°$ C.

13. The process according to claim 6, further characterized in that catalyst component (a) is selected from the group consisting of vanadiumtriacetyl-acetonate, vanadyl trialkoxides, and vanadyl halogen alkoxides; catalyst component (b) is an alkyl aluminum halide; and the monomers are copolymerized at a temperature of $0°$ C. to $125°$ C. in the presence of from 0.05 to 1.0 mol per mol of the alkyl aluminum halide of a complexing agent selected from the group consisting of ethers, thioethers, tertiary amines and trisubstituted phosphines containing a least one branched alkyl group or an aromatic nucleus.

14. The process according to claim 6, further characterized in that catalyst component (a) is a vanadium compound; catalyst component (b) is an alkyl aluminum halide; and both the catalyst preparation and the copolymerization reaction are carried out at a temperature in the range $-80$ C. to $0°$ C.

15. The process according to claim 6, further characterized in that the monomers are copolymerized in the liquid state, in the substantial absence of an extraneous solvent.

16. The process according to claim 6, further characterized in that the monomers are copolymerized in an inert liquid diluent selected from the group consisting of hydrocarbon solvents and halogenated hydrocarbon solvents.

17. Shaped manufactured article comprising the elastomers obtained by sulfur vulcanization of substantially linear, amorphous and vulcanizable unsaturated high molecular weight copolymers of at least one alkylbicyclononadiene having the formula

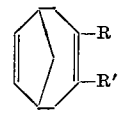

in which R and R' are selected from the group consisting of hydrogen and the methyl group and at least one of them is the methyl group, with ethylene and at least one higher alpha-olefin of the formula $CH_2=CHR$ in which R is an alkyl group containing from 1 to 6 carbon atoms, which copolymers consist essentially of macromolecules made up of polymerized units of each of the starting monomers and in which the ethylene content is at least 5% by mols, the higher alpha-olefin content is from 5% to 95% by mols, and the bicyclononadiene content is from about 0.1% to about 20% by mols.

References Cited

UNITED STATES PATENTS

| | | | |
|---|---|---|---|
| 3,033,835 | 5/1962 | Adamek | 260—79.5 |
| 3,377,399 | 4/1968 | Sartori | 260—666 |

OTHER REFERENCES

Chemical Abstracts: vol. 64: PC 11104a; vol. 66: P 10659v; vol. 68: 12562b.

JOSEPH L. SCHOFER, Primary Examiner

R. S. BENJAMIN, Assistant Examiner

U.S. Cl. X.R.

260—80.78